(12) United States Patent
Wang

(10) Patent No.: US 12,538,396 B2
(45) Date of Patent: Jan. 27, 2026

(54) LED CONTROL SYSTEM

(71) Applicant: Himax Technologies Limited, Tainan (TW)

(72) Inventor: Ming-Chih Wang, Tainan (TW)

(73) Assignee: Himax Technologies Limited, Tainan (TW)

( * ) Notice: Subject to any disclaimer, the term of this patent is extended or adjusted under 35 U.S.C. 154(b) by 204 days.

(21) Appl. No.: 18/523,703

(22) Filed: Nov. 29, 2023

(65) Prior Publication Data

US 2025/0176081 A1    May 29, 2025

(51) Int. Cl.
*H05B 45/14* (2020.01)
*H05B 45/325* (2020.01)
*H05B 45/50* (2022.01)

(52) U.S. Cl.
CPC ........... *H05B 45/14* (2020.01); *H05B 45/325* (2020.01); *H05B 45/50* (2020.01)

(58) Field of Classification Search
CPC ....... H05B 45/14; H05B 45/325; H05B 45/50
See application file for complete search history.

(56) References Cited

U.S. PATENT DOCUMENTS

| | | | | |
|---|---|---|---|---|
| 10,292,227 | B1 * | 5/2019 | Moumen | H05B 45/14 |
| 2006/0186820 | A1 * | 8/2006 | Yang | H05B 47/22 |
| | | | | 315/158 |
| 2022/0189380 | A1 * | 6/2022 | Wang | G09G 3/3275 |
| 2024/0044471 | A1 * | 2/2024 | Herlin | B60Q 1/2607 |

FOREIGN PATENT DOCUMENTS

JP      2015158997 A   *   9/2015

\* cited by examiner

*Primary Examiner* — Abdullah A Riyami
*Assistant Examiner* — Syed M Kaiser
(74) *Attorney, Agent, or Firm* — Donald E. Stout; Stout, Uxa & Buyan, LLI

(57) ABSTRACT

A light-emitting diode (LED) control system includes a LED array composed of a plurality of LED channels each being composed of a plurality of LEDs; a plurality of LED drivers connected in sequence each being configured to drive a corresponding LED channel, the LED channels being controlled in sequence by the LED drivers; and a LED controller that sends brightness data to the LED drivers, which in turn control brightness of the LEDs. After brightness data input has been transferred to an associated LED driver, the brightness data input is then replaced with status data returned by the associated LED driver, and the replaced status data is finally read by the LED controller via other LED drivers.

11 Claims, 5 Drawing Sheets

LED CONTROL SYSTEM

BACKGROUND OF THE INVENTION

1. Field of the Invention

The present invention generally relates to a light-emitting diode (LED) control system, and more particularly to a LED control system capable of reading error status.

2. Description of Related Art

The touch screen is a widely adopted humane-machine interface that can be adapted to in-vehicle applications for enhancing the driving experience. The touch panel of the touch screen serves as an input interface of the in-vehicle devices, and is progressively replacing traditional in-vehicle input interfaces such as rotary controller, steering wheel controls and touchpad.

Serial Peripheral Interface (SPI) is a synchronous serial communication specification used primarily in embedded systems for short-distance wired communication between electronic devices adaptable to in-vehicle applications. SPI can be used as a light-emitting diode (LED) driver interface (I/F) between the LED driver and the microcontroller or other device that controls the LED driver.

Due to the harsh environment faced by in-vehicle applications, the correctness of the system needs to be monitored at all times by reading error status. However, if the number of the LEDs is large, the number of PWM duty cycles that need to be transmitted for the LEDs becomes very large. The extra error status reading will occupy extra bandwidth and affect the number of the LEDs that can be supported. The control process of the microcontroller becomes more complicated and requires controlling latency to confirm that each LED driver has received the PWM duty cycle before issuing a read error status command to read error status. At the same time, additional overhead is also required.

A need has arisen to propose a novel scheme to overcome the drawbacks of conventional LED control systems.

SUMMARY OF THE INVENTION

In view of the foregoing, it is an object of the embodiment of the present invention to provide a light-emitting diode (LED) control system capable of reading error status with simplified scheme without increasing bandwidth.

According to one embodiment, a light-emitting diode (LED) control system includes a LED array, a plurality of LED drivers and a LED controller. The LED array is composed of a plurality of LED channels each being composed of a plurality of LEDs. The LED drivers are connected in sequence each being configured to drive a corresponding LED channel, and the LED channels are controlled in sequence by the LED drivers. The LED controller sends brightness data to the LED drivers, which in turn control brightness of the LEDs. After brightness data input has been transferred to an associated LED driver, the brightness data input is then replaced with status data returned by the associated LED driver, and the replaced status data is finally read by the LED controller via other LED drivers.

DETAILED DESCRIPTION OF THE INVENTION

Figure 1A:
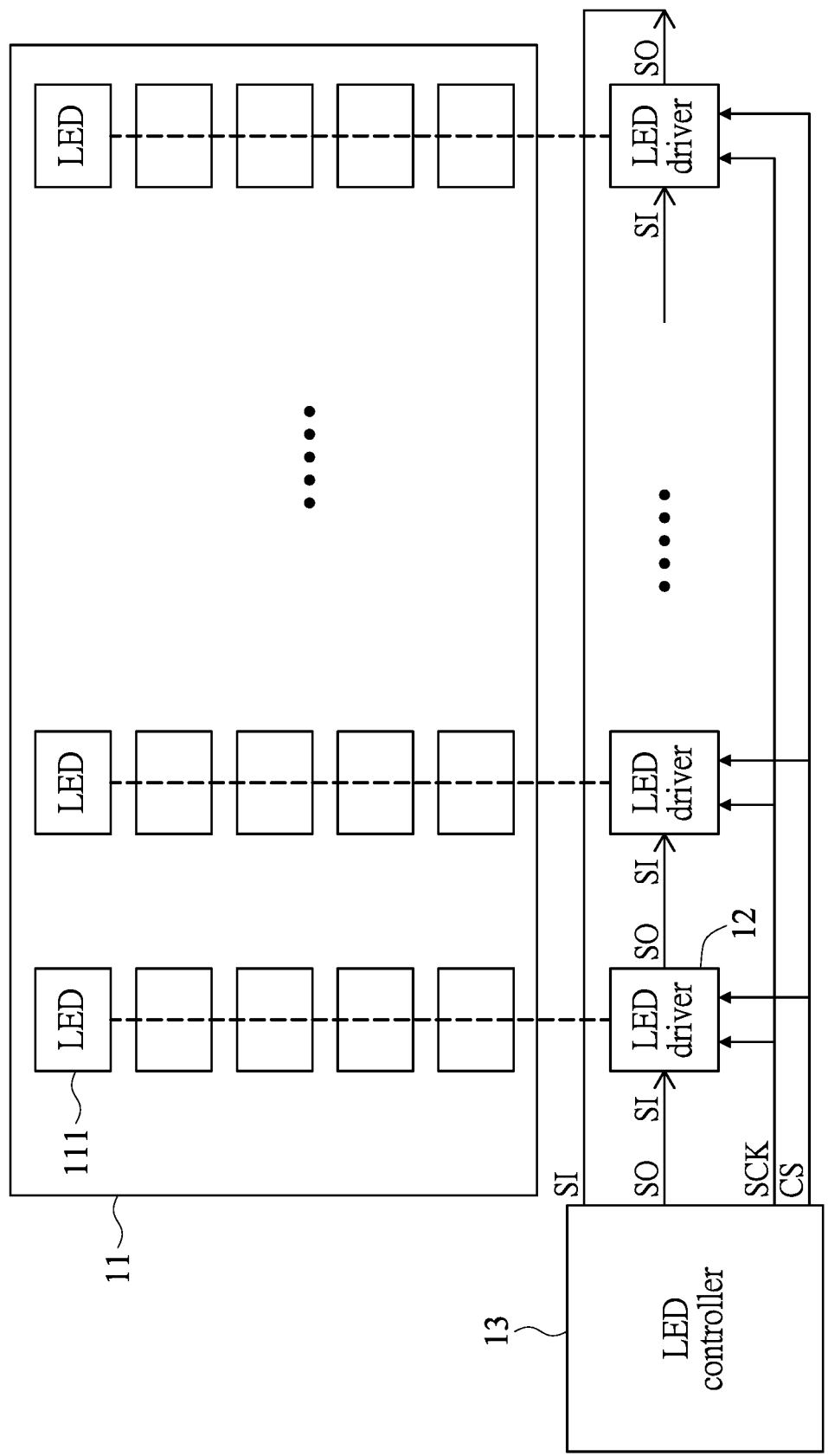
FIG. 1A shows a block diagram illustrating a light-emitting diode (LED) control system according to one embodiment of the present invention.

FIG. 1A shows a block diagram illustrating a light-emitting diode (LED) control system 100 according to one embodiment of the present invention. The LED control system 100 of the embodiment may, but not limited to, be used as backlight of liquid crystal display (LCD) adaptable to in-vehicle applications.

In the embodiment, the LED control system 100 may include a LED array 11 composed of a plurality of LED channels each being composed of a plurality of LEDs 111.

The LED control system 100 of the embodiment may include a plurality of LED drivers 12 connected in sequence each being configured to drive a corresponding LED channel. The LED control system 100 may include a LED controller 13 (e.g., a timing controller) configured to send brightness data (such as, but not limited to, pulse width modulation (PWM) duty) to the LED drivers 12, which in turn control brightness of the LEDs 111.

In the embodiment, a synchronous serial communication interface (or specification) such as Serial Peripheral Interface (SPI) is adopted as a light-emitting diode (LED) driver interface (I/F) between the LED controller 13 and the LED drivers 12, such that the LED channels of the LED array 11 are controlled in sequence by the LED drivers 12 through daisy chain. Specifically, each LED driver 12 receives brightness data input SI from a preceding LED driver 12 (however, the first LED driver 12 receives brightness data input SI from the LED controller 13), and each LED driver 12 sends brightness data output SO to a succeeding LED driver 12 (however, the last LED driver 12 sends brightness data output SO back to the LED controller 13. It is noted that the more the number of LEDs 111, the greater the bandwidth requirement.

As shown in FIG. 1A, the LED controller 13 may generate a chip select signal CS, a signal used in SPI communication, used to select (or enable) one of the LED drivers 12 that are connected to the SPI bus. The LED controller 13 may also generate a serial clock (SCK), a signal used in SPI communication, used to clock data into and out of the LED drivers 12, thereby synchronizing data transfer between the LED controller 13 and the LED drivers 12.

Figure 1B:
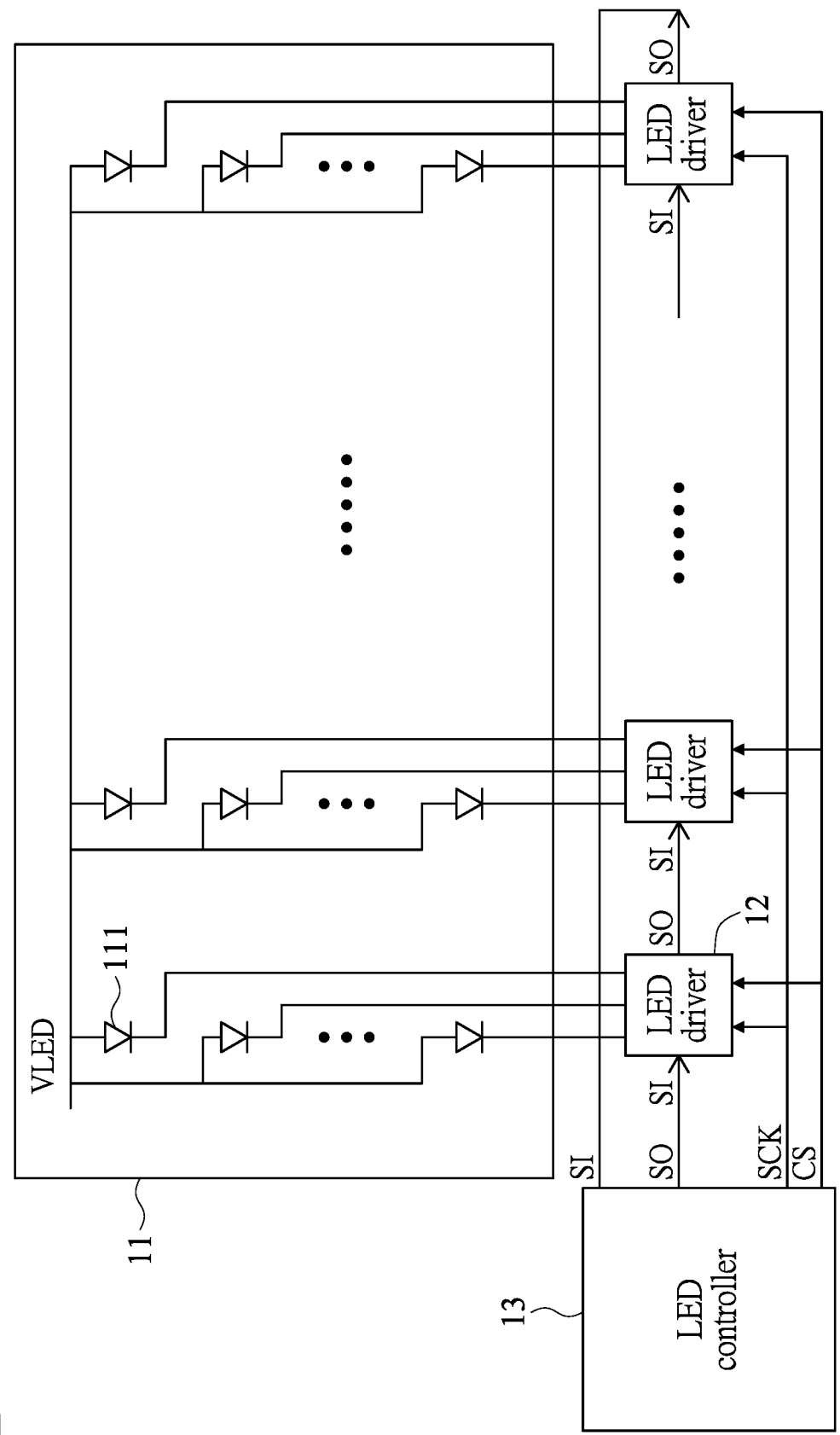
FIG. 1B shows a detailed block diagram of the LED control system of FIG. 1A.

FIG. 1B shows a detailed block diagram of the LED control system 100 of FIG. 1A. Specifically, the LEDs 111 at the same channel are connected in parallel between a power supply VLED and a corresponding LED driver 12, with first electrodes (e.g., anodes) connected to the power supply VLED and second electrodes (e.g., cathodes) connected to the corresponding LED driver 12.

Generally speaking, data transfer in SPI communication is operated by commands with separated read/write registers.

Figure 2:
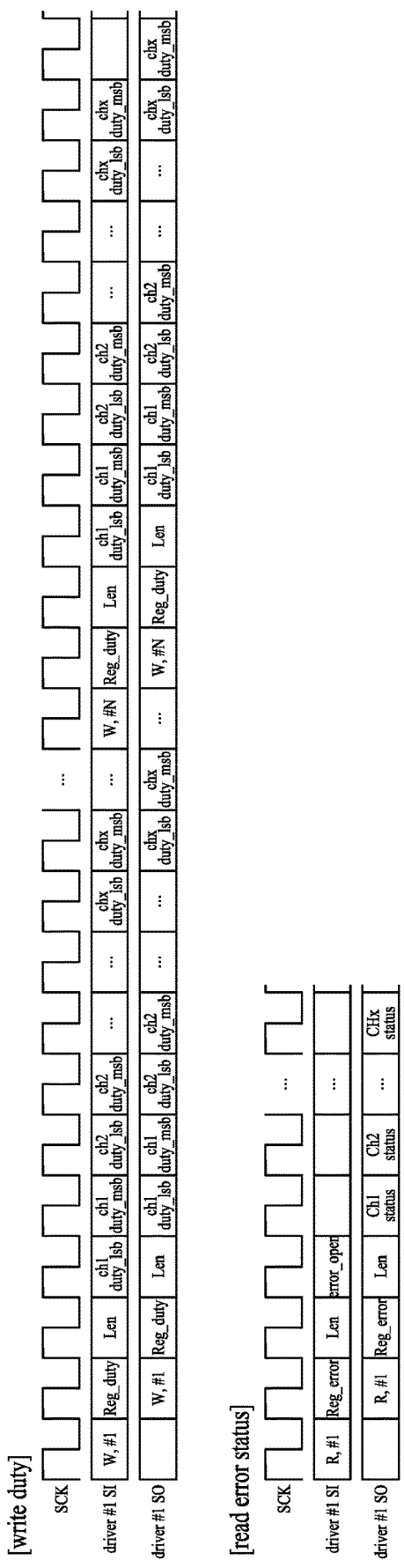
FIG. 2 shows format of exemplary brightness data input SI and brightness data output SO.

FIG. 2 shows format (or fields) of exemplary brightness data input SI and brightness data output SO. A register is a small amount of fast storage that is available as part of the LED controller 13, and is used to store data that is being used by the LED controller 13 in real-time. Read/write registers are used to store data that can be read or written by the LED controller 13.

SPI communication primarily transmits setting and pulse width modulation (PWM) duty. The LED controller 13 may read error status occurred in the LED control system 100 with extra error status reading, particularly for in-vehicle applications to increase safety by providing measures that are taken to ensure the safety on driving operation and vehicle control.

However, if the number of the LEDs 111 is large, the number of PWM duty cycles that need to be transmitted for the LEDs 111 becomes very large. The extra error status reading will occupy extra bandwidth and affect the number of the LEDs 111 that can be supported. The control process of the LED controller 13 becomes more complicated and requires controlling latency to confirm that each LED driver 12 has received the PWM duty cycle before issuing a read error status command to read error status as exemplified in FIG. 2. At the same time, additional overhead is also required.

Figure 3A:
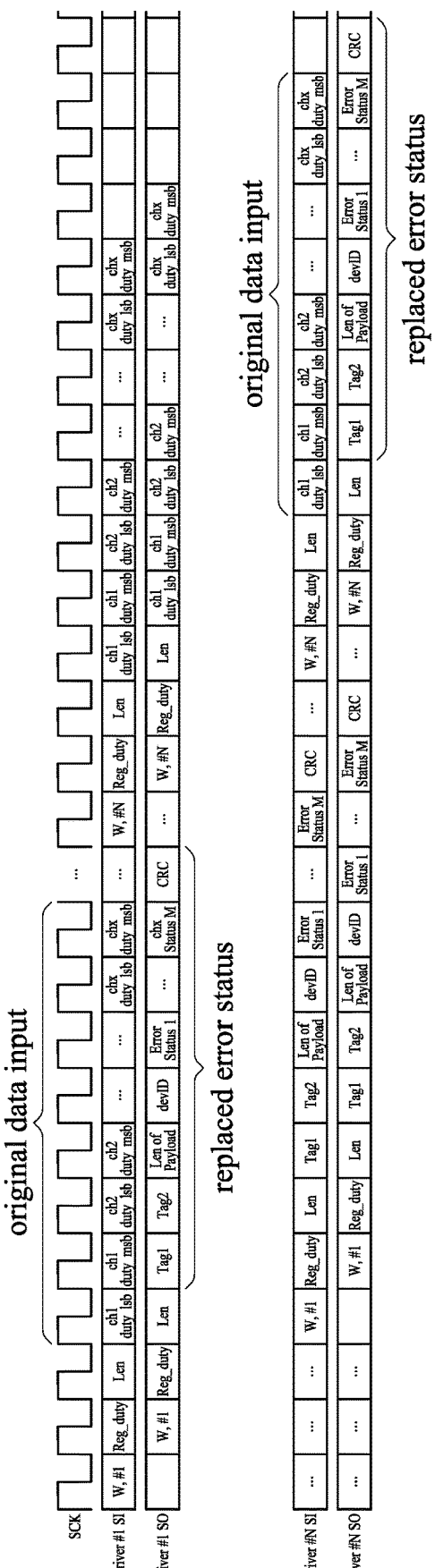
FIG. 3A shows format of a brightness data input SI of an associated LED driver, and format of a brightness data output SO with replaced error status after the brightness data input SI has been transferred to the associated LED driver.

According to one aspect of the embodiment, after brightness data input SI has been transferred to an associated LED driver 12, the brightness data input is then replaced with status data such as error status (returned or feedback by the associated LED driver 12), which is finally read by the LED controller 13 via other LED drivers 12 without extra error status reading command. FIG. 3A shows format (or fields) of a brightness data input SI of an associated LED driver 12, and format (or fields) of a brightness data output SO with replaced error status after the brightness data input SI has been transferred to the associated LED driver 12.

Because of the daisy chain scheme, the brightness data is transmitted one by one, but the brightness data given to a certain LED driver 12 is only valid for that LED driver 12. After the LED driver 12 receives the brightness data, it is no longer required (or becomes invalid). Therefore, the brightness data can be replaced with other data, such as error status, to be received by the LED controller 13 without affecting proper data transfer between the LED controller 13 and the LED drivers 12. Therefore, the control process can be simplified with reduced bandwidth.

Figure 3B:
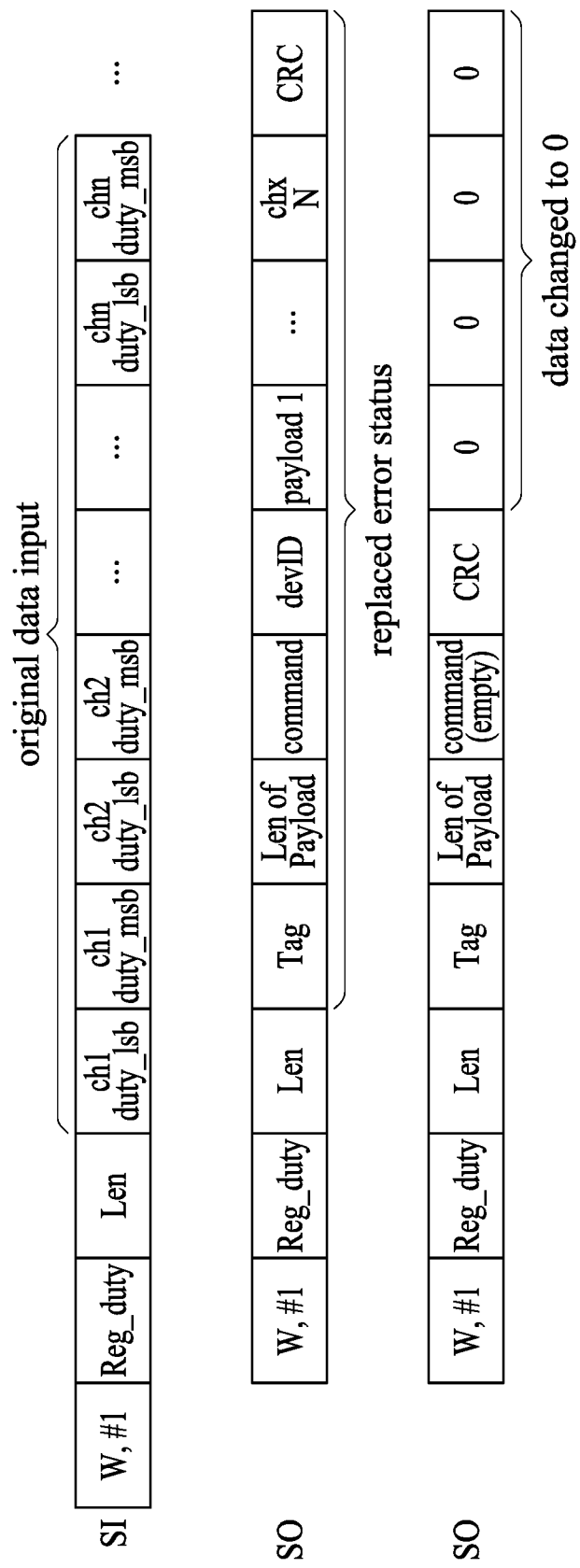
FIG. 3B shows format of a brightness data input SI of an associated LED driver, and alternative format of a brightness data output SO with replaced error status after the brightness data input SI has been transferred to the associated LED driver.

FIG. 3B shows format (or fields) of a brightness data input SI of an associated LED driver 12, and alternative format (or fields) of a brightness data output SO with replaced error status after the brightness data input SI has been transferred to the associated LED driver 12. Specifically, a command field may be added to represent different commands to feedback data for different purposes. Error status is sent once every few frames. As exemplified in FIG. 3B, the first brightness data output SO is used to send error status for the first frame, while the empty command (as exemplified in the second brightness data output SO) for other frames is sent with data changed to 0 (no toggling) to reduce the electromagnetic interference (EMI) effect of IO toggling.

Although specific embodiments have been illustrated and described, it will be appreciated by those skilled in the art that various modifications may be made without departing from the scope of the present invention, which is intended to be limited solely by the appended claims.

What is claimed is:

1. A light-emitting diode (LED) control system, comprising:
   a LED array composed of a plurality of LED channels each being composed of a plurality of LEDs;
   a plurality of LED drivers connected in sequence each being configured to drive a corresponding LED channel, the LED channels being controlled in sequence by the LED drivers; and
   a LED controller that sends brightness data to the LED drivers, which in turn control brightness of the LEDs;
   wherein after brightness data input has been transferred to an associated LED driver, the brightness data input is then replaced with status data returned by the associated LED driver, and the replaced status data is finally read by the LED controller via other LED drivers.

2. The system of claim 1, wherein the LED channels are controlled in sequence by the LED drivers through daisy chain.

3. The system of claim 1, further comprising a timing controller that includes the LED controller.

4. The system of claim 1, wherein a synchronous serial communication interface is adopted as a LED driver interface between the LED controller and the LED drivers.

5. The system of claim 4, wherein the synchronous serial communication interface comprises Serial Peripheral Interface (SPI).

6. The system of claim 1, wherein each LED driver receives brightness data input from a preceding LED driver and each LED driver sends brightness data output to a succeeding LED driver, but a first LED driver receives brightness data input from the LED controller and a last LED driver sends brightness data output back to the LED controller.

7. The system of claim 1, wherein the status data comprises error status.

8. The system of claim 1, wherein the replaced status data is read by the LED controller without extra status reading command.

9. The system of claim 1, wherein the brightness data input is replaced with status data once every few frames.

10. The system of claim 9, wherein an empty command with data changed to 0 is used in frames while no status data is replaced.

11. The system of claim 1, wherein the brightness data comprises pulse width modulation (PWM) duty.

* * * * *